United States Patent [19]

Komatsu

[11] Patent Number: 5,763,344
[45] Date of Patent: Jun. 9, 1998

[54] ALUMINUM NITRIDE SINTERED BODY AND METHOD OF MANUFACTURING THE SAME

[75] Inventor: Michiyasu Komatsu, Yokohama, Japan

[73] Assignee: Kabushiki Kaisha Toshiba, Kawasaki, Japan

[21] Appl. No.: 666,475

[22] PCT Filed: Nov. 30, 1995

[86] PCT No.: PCT/JP95/02449

§ 371 Date: Sep. 4, 1996

§ 102(e) Date: Sep. 4, 1996

[87] PCT Pub. No.: WO96/16916

PCT Pub. Date: Jun. 6, 1996

[30] Foreign Application Priority Data

Dec. 1, 1994 [JP] Japan ............... 6-298360
Dec. 1, 1994 [JP] Japan ............... 6-298361

[51] Int. Cl.$^6$ ............................................. C04B 35/581
[52] U.S. Cl. .................. 501/98.4; 501/98.5; 501/32; 264/65
[58] Field of Search .................... 501/96, 32, 98.4, 501/98.5; 264/65

[56] References Cited

U.S. PATENT DOCUMENTS

| | | | |
|---|---|---|---|
| 4,777,155 | 10/1988 | Baba et al. | 501/87 |
| 4,833,108 | 5/1989 | Mizuno et al. | 501/98 |
| 5,073,526 | 12/1991 | Enloe et al. | 501/96 |
| 5,102,749 | 4/1992 | Enloe et al. | 428/698 |
| 5,154,863 | 10/1992 | Miyahara | 264/65 |
| 5,214,005 | 5/1993 | Yamakawa et al. | 501/32 |
| 5,314,850 | 5/1994 | Miyahara | 264/65 |
| 5,459,113 | 10/1995 | Nozaki et al. | 501/96 |
| 5,482,903 | 1/1996 | Duncombe et al. | 501/32 |
| 5,508,240 | 4/1996 | Komatsu et al. | 501/96 |
| 5,541,145 | 7/1996 | Harris et al. | 501/96 |

FOREIGN PATENT DOCUMENTS

| | | |
|---|---|---|
| 0 287 841 | 10/1988 | European Pat. Off. . |
| 4-300249 | 10/1992 | Japan . |
| 6-53656 | 2/1994 | Japan . |
| WO 95/17355 | 6/1995 | WIPO . |

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

The present invention provides an aluminum nitride sintered body made by being sintered at a low temperature of 1650° C. or less comprises 0.5 to 7 wt % of oxide of at least one element selected from Group IIIa elements in the periodic table, 0.5 to 3 wt % of calcium oxide, 1.5 wt % or less of aluminum oxide, 0.2 to 1 wt % of glass frit, 0.5 wt % or less of at least one selected from lithium oxide, manganese oxide, chromium oxide, zirconium oxide, strontium oxide and titanium oxide, 1 wt % or less of tungsten in terms of oxide thereof and the balance being aluminum nitride. Calcium tungstate may be contained in an amount of 1 to 3 wt % in place of calcium oxide and tungsten. Further, the aluminum nitride sintered body may be arranged to contain 0.1 to 0.5 wt % of boron oxide, 0.05 to 0.2 wt % of sodium oxide and 0.05 to 0.2 wt % of potassium oxide in place of glass frit.

13 Claims, No Drawings

ALUMINUM NITRIDE SINTERED BODY AND METHOD OF MANUFACTURING THE SAME

TECHNICAL FIELD

The present invention relates to an aluminum nitride sintered body used as electronics parts such as semiconductor substrates and the like and structural components and a method of manufacturing the aluminum nitride sintered body, and more specifically, to an aluminum nitride sintered body provided with a high thermal conductivity intrinsic to the aluminum nitride (AlN) sintered body as well as high density or minuteness equal to or greater than that of conventional AlN sintered body and further improved corrosion resistance and a method of manufacturing the aluminum nitride sintered body.

BACKGROUND ART DISCLOSURE

Ceramic sintered bodies which are excellent in various characteristics such as strength, heat resistance, corrosion resistance, wear resistance, lightness and the like as compared with conventional metal materials have been widely used as machines parts, functional parts, structural members and ornament materials such as semiconductor substrates, electronic equipment materials, engine parts, high speed cutting tool materials, nozzles, bearings and the like which are used under severe conditions of temperature, stress and wear which cannot be endured by the conventional metal material.

In particular, since an aluminum nitride (AlN) sintered body is an insulator having a high thermal (heat) conductivity and has a coefficient of thermal expansion near to that of silicon (Si), it finds an enlarged field of application as radiation plates and substrates of highly-integrated semiconductor devices.

Conventionally, the above aluminum nitride sintered body is generally made in large quantities by the following method. That is, a mixed material is prepared in such a manner that aluminum nitride material powder is added with sintering assistants, an organic binder and when necessary with various additives, solvent and a dispersing agent and the thus obtained mixed material is molded to a thin or sheet-shaped molded body by a doctor blade method or a slurry casting method or pressed to a thick or large molded body. Next, the thus obtained molded body is degreased by being heated in air or a nitrogen gas atmosphere to remove a hydrocarbon component and the like used as the organic binder. Then, the decreased molded body is densely sintered by being heated to a high temperature of about 1700° to 1900° C. in a non-oxidizing atmosphere such as a nitrogen gas or the like and formed to the aluminum nitride sintered body.

In the manufacturing method described above, when ultra-fine material powder having an average grain size of about 0.5 μm or less is used as the material AlN powder, a considerably dense and fine sintered body can be obtained even if the AlN powder is used independently. However, a lot of impurities such as oxygen etc. adhered on the surface and the like of the material powder are dissolved in AlN crystal lattices or create composite oxides such as an Al—O—N compound and the like which prevent the transmission of lattice vibration when sintering is carried out, with a result that the AlN sintered body not using a sintering assistant has a relatively low thermal conductivity (heat transfer coefficient).

On the other hand, when AlN powder having an average grain size of 1 μm or more is used as the material powder, since the sintering property of the material powder is not good when it is used independently, it is difficult to obtain a dense and minute sintered body by a method other than a hot-pressing method when no assistant agent is added, thus the above AlN powder has a drawback that mass-productivity is low. Thus, when it is intended to effectively make a sintered body by an ordinary pressure sintering method, it is a generally employed practice to add rare earth oxides and the like such as yttrium oxide ($Y_2O_3$) etc.

It is contemplated that these sintering assistants form liquid phases by being reacted with impurity oxides and $Al_2O_3$ contained in the AlN material powder to thereby make the sintered body dense and minute as well as fix the impurity oxides as grain boundary phases and provide the sintered body with high thermal conductivity.

However, in the above conventional manufacturing method, since the sintering temperature is very high of 1700° to 1900° C., a cost of manufacturing equipment including a sintering furnace is expensive as well as it is difficult to employ a continuous manufacturing process, thus an increase of a manufacturing cost of the AlN sintered body and a decrease of productivity thereof cannot be avoided. That is, since the sintering temperature is high, it is essential to use a sintering furnace using an expensive graphite (carbon) material excellent in heat resistance as the heat insulating material and the heater material of the sintering furnace. Even if the graphite material is used, however, since there is a large amount of heat influence, there is a drawback that the sintering furnace has a short life and the insulating material must be replaced once every 2 to 3 years, thus there is a problem that costs of manufacturing equipment and maintenance are greatly increased in any way.

Further, there is also a drawback that since a batch type (rotary type) sintering furnace cannot be employed to effectively maintain a sealed high temperature atmosphere, it is difficult to introduce a continuous manufacturing process and thus the mass-productivity of the sintered body is lowered.

In particular, since a molded body must be sintered for a long time of 20 to 100 hours at a high temperature of about 1900° C. in an atmosphere containing carbon and nitrogen to remove grain boundary phases acting as heat resistance in order to obtain an AlN sintered body having high thermal conductivity, the above problems of the equipment and mass-productivity become more serious.

Further, in the aforesaid conventional manufacturing method, since the wettability of between the AlN sintered body and the liquid phase compounds is low and the liquid phases has a property liable to segregate by itself, when the liquid phases are solidified after sintering, the liquid phases remain so as to irregularly exist in the gaps of the AlN grains, thus there is a tendency that a solidified, coarse and brittle grain boundary phases are formed. Further, there is a problem that grains are liable to grow, coarse grains having an average grain size of 5 to 10 μm tend to be formed, fine pores remain in the grains without being disappeared to prevent a sintered body from being made to dense and minute and what is obtained finally is only an aluminum nitride sintered body of low strength whose three-point bending strength is about 350 to 400 MPa.

Recently, the above aluminum nitride material having high thermal conductivity (high heat radiating property) is being widely used to cope with an amount of heat which is increased as semiconductor devices are highly integrated and the output thereof is increased, and an almost satisfactory result is obtained as to the radiating property thereof.

However, since the strength of the aluminum nitride material is insufficient when it is used as the structural member as described above, a problem also arises in that when a semiconductor substrate formed of, for example, the aluminum nitride sintered body is mounted to a mounting board, the semiconductor substrate is damaged by a small amount of bending stress acting on it when it is mounted and impact force acting thereon when the substrate is handled and as a result the manufacturing yield of a semiconductor circuit substrate is greatly lowered.

Further, since the above AlN sintered body has insufficient corrosion resistance to acid and alkali, the sintered body has a drawback that when it is processed as a semiconductor device material, it is liable to be damaged in a circuit forming process using an alkaline etching solution and an acid cleaning process. In addition, when the aluminum nitride sintered body is used as the structural material, acid and alkali brittleness is liable to proceed by a chemical substances such as chemicals and the like depending upon the environment in which it is used, thus there is a problem that sufficient durability and reliability cannot be obtained.

An object of the present invention made to solve the above problems is to provide an AlN sintered body which maintains high thermal conductivity intrinsic to it even if the sintered body is sintered particularly at a low temperature of 1650° C. or less, has density or minuteness similar to or greater than that of a conventional AlN sintered body and further has improved corrosion resistance and mechanical strength and a method of manufacturing the AlN sintered body.

DISCLOSURE OF THE INVENTION

To achieve the above object, the inventors variously changed the type and the additive amount of sintering assistants to be added to aluminum nitride material powder and the sintering temperature thereof and carried out experiments and examinations as to how they influenced onto the corrosion resistance, density, strength and thermal (heat) conductive characteristic of the sintered body.

As a result, the inventors have obtained a knowledge that when glass frit and oxides of B, Na, K, Ca, Mn, W, etc. are added in a slight amount in combination in addition to a sintering assistant composed of oxides of Group IIIa elements of the periodic table, a sintering property is greatly improved and an AlN sintered body having thermal conductivity, density and strength similar to or greater than those of a conventional aluminum nitride sintered body and a greatly improved corrosion resistance can be obtained.

Further, it is contemplated that a protective film composed of a glass frit component is formed on the surface of AlN crystal grains constituting the AlN sintered body by the addition of a small amount of glass frit, whereby the durability of the AlN sintered body is greatly improved as well as the boundary bonding strength between the AlN grains is increased by the film, thus the AlN sintered body excellent in mechanical strength is obtained. The present invention has been completed based on the above knowledge.

That is, a first aluminum nitride sintered body according to the present invention is an aluminum nitride sintered body made by being sintered at a low temperature of 1650° C. or less which comprises 0.5 to 7 wt % of oxide of at least one element selected from Group IIIa elements in the periodic table, 0.5 to 3 wt % of calcium oxide, 1.5 wt % or less of aluminium oxide, 0.2 to 1 wt % of glass frit, 0.5 wt % or less of at least one selected from lithium oxide, manganese oxide, chromium oxide, zirconium oxide, strontium oxide and titanium oxide, 1 wt % or less of tungsten in terms of oxide and the balance being aluminum nitride.

In the above first aluminum nitride sintered body, 1 to 3 wt % of calcium tungstate may be contained in place of calcium oxide and tungsten.

The glass frit used in the present invention is composed of powder containing 50 wt % or more of $SiO_2$ and oxides of alkaline metals such as Na, K etc., oxides of alkaline earth metals such as Mg, Ca etc. and oxides of Pb, Al etc. in an amount of 5 to 50 wt % in addition to the above $SiO_2$.

That is, the glass frit used in the present invention is at least one selected from borosilicate glass, aluminoborosilicate glass, 96% quartz glass, soda lime glass, lead glass, aluminosilicate glass and special glass. Crystallized glass, alkali resistant glass and the like are preferable as the special glass.

A second aluminum nitride sintered body according to the present invention is an aluminum nitride sintered body made by being sintered at a low temperature of 1650° C. or less which comprises 0.5 to 7 wt % of oxide of at least one element selected from Group IIIa elements in the periodic table, 0.5 to 3 wt % of calcium oxide, 1.5 wt % or less of aluminium oxide, 0.1 to 0.5 wt % of boron oxide, 0.05 to 0.2 wt % of sodium oxide, 0.05 to 0.2 wt % of potassium oxide, 0.5 wt % or less of at least one selected from lithium oxide, manganese oxide, chromium oxide, zirconium oxide, strontium oxide and titanium oxide, 1 wt % or less of tungsten in terms of oxide and the balance being aluminum nitride.

Note, 1 to 3 wt % calcium tungstate may be contained in place of calcium oxide and tungsten also in the second aluminum nitride sintered body.

The content of impurity cations such as Fe, Mg etc. is preferably set to 0.2 wt % or less. In particular, caution must be taken to Mg because it forms a spinel compound having a large amount of heat resistance in the AlN structure and is liable to lower the thermal conductivity (heat transfer coefficient) of the sintered body. Further, the sintered body preferably has an average crystal grain size in the range of from 1 to 4 μm.

The AlN sintered body composed of the above composition has a thermal conductivity (heat transfer coefficient) of 110 W/(mK) or more. Further, the sintered body exhibits such excellent corrosion resistance to acid and alkali that when the sintered body is immersed into a hydrochloric acid (HCl) solution of 10% concentration at an ordinary temperature (25° C. ) for 24 hours, the decrease of weight of the sintered body caused after the immersion is one third or less that of a conventional sintered body as well as when the sintered body is immersed into a caustic soda (NaOH) solution of 10% concentration at an ordinary temperature (25° C. ) for 24 hours, the decrease of weight of the sintered body after the immersion is one half or less that of the conventional sintered body.

A first method of manufacturing an aluminum nitride sintered body according to the present invention comprises the steps of molding a material mixture by adding 0.5 to 7 wt % of oxide of at least one element selected from Group IIIa elements in the periodic table, 0.5 to 3 wt % of calcium oxide, 1.5 wt % or less of aluminum oxide, 0.2 to 1 wt % of glass frit, 0.5 wt % or less of at least one selected from lithium oxide, manganese oxide, chromium oxide, zirconium oxide, strontium oxide and titanium oxide, and 1 wt % or less of tungsten in terms of oxide to aluminum nitride material powder to form a molded body and sintering the thus obtained molded body in a non-oxidizing atmosphere at a low temperature of 1650° C. or less.

A second method of manufacturing an aluminum nitride sintered body comprises the steps of molding a material mixture by adding 0.5 to 7 wt % of oxide of at least one element selected from Group IIIa elements in the periodic table, 0.5 to 3 wt % of calcium oxide, 1.5 wt % or less of aluminum oxide, 0.1 to 0.5 wt % of boron oxide, 0.05 to 0.2 wt % of sodium oxide, 0.05 to 0.2 wt % of potassium oxide, 0.5 wt % or less of at least one selected from lithium oxide, manganese oxide, chromium oxide, zirconium oxide, strontium oxide and titanium oxide, and 1 wt % or less of tungsten in terms of oxide to aluminium nitride material powder to form a molded body and sintering the thus obtained molded body in a non-oxidizing atmosphere at a low temperature of 1650° C. or less.

Note, 1 to 3 wt % of calcium tungstate may be added in place of calcium oxide and tungsten in the above first and second aluminum nitride sintered body manufacturing methods.

It is preferable to use fine AlN powder which contains impurity oxygen suppressed to 1.3 wt % or less by taking sintering property and thermal conductivity into consideration and has an average grain size of 0.5 to 2 μm or less and preferably 1.5 μm or less as the aluminum nitride (AlN) material powder used in the methods of the present invention and serves as the main component of the sintered body.

Oxides of Group IIIa elements of the periodic table (long period type) act as a sintering assistant and are added within the range of 0.5 to 7 wt % to the AlN material powder to make the AlN sintered body dense and minute. As specific examples of the sintering assistant, oxides of rare earth elements (Y, Sc, Ce, Dy etc.) or substances made to the compounds thereof by sintering operation are used and in particular, yttrium oxide ($Y_2O_3$) is preferably used.

When the additive amount of the sintering assistant is less than 0.5 wt %, since an effect for improving the sintering property is not sufficiently exhibited, the sintered body is not made dense and minute, thus a sintered body of low strength is disadvantageously formed or oxygen is dissolved in AlN crystals and a sintered body having a high thermal conductivity (high heat transfer coefficient) cannot be formed. On the other hand, when the additive amount is excessively large in excess of 7 wt %, the effect of the sintering assistant is saturated and has no meaning as well as the thermal conductivity of an AlN sintered body obtained by being sintered is lowered and a large amount of boundary phases remain in the sintered body. Further, since the boundary phases removed by heat treatment has a large volume, pores remain in the sintered body to thereby increase a contraction ratio, thus the sintered body is liable to be deformed.

Further, a sintering temperature must be set to a high degree to achieve a sintered body of high density and for this purpose the components of a sintering furnace must have an enhanced heat resistant specification and a continuous sintering operation is made difficult, by which the manufacturing cost of the sintered body and the mass-productivity thereof are lowered. The preferable additive amount of the oxides of Group IIIa elements is 1 to 2 wt %.

Note, the additive amount of the oxides of Group IIIa elements in the aluminum nitride sintered body to which $CaWO_3$ is added in place of calcium oxide is set to the range of 0.5 to 5 wt % and more preferably to the range of 1 to 2 wt % from the relation thereof to the additive amounts of other components.

The glass frit is a component effective to improve the sintering property by lowering a sintering temperature and form a protective film on the surface of the AlN grains constituting the AlN sintered body to thereby greatly improve the corrosion resistance of the AlN sintered body as well as increase the mechanical, strength thereof by increasing the boundary joint strength between the AlN grains.

Synthetic glass powder having the chemical compositions shown by symbols A to I in Table 1 is preferable as the specific examples of the above glass frit.

TABLE 1

| SYMBOL | TYPE OF GLASS FRIT | CHEMICAL COMPOSITION (WT %) | | | | | | | | | | OTHER COMPONENT |
|---|---|---|---|---|---|---|---|---|---|---|---|---|
| | | $SiO_2$ | $Na_2O$ | $K_2O$ | CaO | MgO | BaO | PbO | $B_2O_3$ | $Al_2O_3$ | $Li_2O$ | |
| A | BOROSILICATE GLASS (I) | 70 | | 0.5 | | | | | 28 | 1.1 | 1.2 | |
| B | BOROSILICATE GLASS (II) | 80.5 | 3.8 | 0.4 | | | | | 12.9 | 2.2 | | |
| C | ALMINOSILICATE GLASS | 57 | 1.0 | | 5.5 | 12 | | | 4 | 20.5 | | |
| D | ALMINO-BOROSILICATE GLASS | 74.7 | 6.4 | 0.5 | 0.9 | | 2.2 | | 9.6 | 5.6 | | |
| E | SODA LIME GLASS | 73.6 | 16 | 0.6 | 5.2 | 3.6 | | | | 1 | | |
| F | LEAD GLASS | 63 | 7.6 | 6 | 0.3 | 0.2 | | 21 | 0.2 | 0.6 | | |
| G | ALMINOSILICATE GLASS CONTAINING $Y_2O_3$ | 54 | 1.0 | | 5.2 | 11 | | | 3.8 | 19.5 | | $Y_2O_3$ 5 |
| H | 96% QUARTZ GLASS | 96.3 | 0.2 | 0.2 | | | | | 2.9 | 0.4 | | |
| I | SPECIAL GLASS | 62 | 14–15 | | 5 | 1 | | | | | | $ZrO_2$ 17 |

Each glass frit is made by being synthesized in such a manner that mixed powder regulated to have a predetermined chemical composition is melted in air at about 1500° C. and then solidified by being cooled and the thus obtained solidified body is finely ground. It is preferable to regulate the grain size of the glass frit to about 1 μm.

The glass frit is added to the AlN sintered body in the range of 0.2 to 1 wt %. When the additive amount of the glass frit is less than 0.2 wt %, the sintering temperature is not effectively lowered and the corrosion resistance and strength are not sufficiently improved. On the other hand, when the additive amount is excessively large in excess of 1 wt %, the thermal conductivity (heat transfer coefficient) of the AlN sintered body is lowered. Thus, although the additive amount is set to the above range, it is more preferably in the range of 0.2 to 0.5 wt %.

Since calcium oxide (CaO) is a component capable of improving the sintering property by more effectively lowering the sintering temperature when it is added in combination with the oxides of Group IIIa elements and $WO_3$, it is added in the range of 0.5 to 3 wt % in the present invention. When the additive amount of calcium oxide is too small in the amount less than 0.5 wt %, the sintering property is not so effectively improved. On the other hand, when the additive amount exceeds 3 wt %, the corrosion resistance of the sintered body with respect to acid and alkali is lowered as well as the thermal conductivity (heat transfer coefficient) thereof is also lowered, thus the sintering temperature must be set to a high level to achieve a certain degree of density. Therefore, the additive amount of calcium oxide is set to the above range and it is preferably in the range of 0.5 to 1.5 wt %.

Since aluminium oxide ($Al_2O_3$) has an effect for lowering the sintering temperature as well as improving the fracture toughness (breaking toughness) value of the AlN sintered body, the content thereof is regulated to the range of 1.5 wt % or less. When the content of $Al_2O_3$ is excessively large in excess of 1.5 wt %, the thermal conductivity (heat transfer coefficient) of the sintered body is lowered. The more preferable content of $Al_2O_3$ is 1 wt % or less. Note, the $Al_2O_3$ component may added in such a manner that the component is separately added as an additive. $Al_2O_3$ produced when AlN material is oxidized while being ground is mixed. AlN material powder is heated in an atmosphere containing oxygen and the $Al_2O_3$ component made by surface oxidation is added.

Since boron oxide ($B_2O_3$) is a component capable of improving the sintering property by lowering the sintering temperature when it is added in combination with the other additives, it is added in the range of 0.1 to 0.5 wt %. When the additive amount is less than 0.1 wt %, the sintering property is less effectively improved, whereas when the additive amount exceeds 0.5 wt %, the thermal conductivity (heat transfer coefficient) of the AlN sintered body is lowered likewise the case of the other impurities.

Since sodium oxide ($Na_2O$) is also a component capable of improving the sintering property by lowering the sintering temperature when it is added in combination with the other additives, it is added in the range of 0.05 to 0.2 wt %. When the additive amount is less than 0.05 wt %, the sintering property is less effectively improved, whereas when the additive amount exceeds 0.2 wt %, the thermal conductivity (heat transfer coefficient) of the AlN sintered body is lowered likewise the case of the other impurities.

Since potassium oxide ($K_2O$) is also a component capable of improving the sintering property by lowering the sintering temperature when it is added in combination with the other additives, it is added in the range of 0.05 to 0.2 wt %. When the additive amount is less than 0.05 wt %, the sintering property is less effectively improved, whereas when the additive amount exceeds 0.2 wt %, thermal conductivity of the AlN sintered body is lowered likewise the case of the other impurities.

Since lithium oxide ($Li_2O$), manganese oxide (MnO), chromium oxide ($Cr_2O_3$), zirconium oxide ($ZrO_2$), strontium oxide (SrO) and titanium oxide ($TiO_2$) are also components capable of improving the sintering property by lowering the sintering temperature, they are added in the range of 0.5 wt % or less. In particular, manganese oxide is preferable. When the additive amount of them is excessively large in excess of 0.5 wt %, the thermal conductivity of the AlN sintered body is lowered likewise the case of the other impurities.

Since tungsten oxides such as $WO_3$ etc. are components capable of effectively improving the sintering property by lowering the sintering temperature when it is added in combination with calcium oxide (CaO), they are added in the range of 1 wt % or less in the above first AlN sintered body. When the additive amount is excessively large in excess of 1 wt %, they lower the thermal conductivity of the AlN aluminum nitride material powder likewise the other impurities.

Note, the same characteristics can be obtained when calcium tungstate ($CaWO_4$) is added in place of calcium oxide (CaO) and tungsten oxide ($WO_3$) which are added in the respective AlN sintered bodies. As described above, a particularly remarkable effect for lowering the sintering temperature can be obtained by adding CaO in combination with $WO_3$. In this case, the additive amount of $CaWO_4$ is set to the range of 1 to 3 wt %. When the additive amount is less than 1 wt %, the sintering temperature lowering effect is small, whereas when it exceeds 3 wt %, the thermal conductivity of the AlN sintered body is lowered.

Further, since impurity cations such as Fe, Mg etc. are liable to form compounds injuring the thermal conductivity of the AlN sintered body, the content thereof in the AlN sintered body is set to 0.2 wt % or less.

The above AlN material powder and the additives such as the various sintering assistants, and glass frit component and the like are charged into a grinding/mixing machine such as, for example, a ball mill or the like and made to an uniform mixed material by being mixed for a predetermined period of time. Next, the thus obtained mixed material is filled in a metal mold having a predetermined shape and pressed to form molded bodies. At the time, the mixed material is previously added with an organic binder such as paraffin, stearic acid etc. in an amount of 5 to 10 wt % so that molding operation can be smoothly carried out.

Applicable as a molding method are a general-purpose metal mold press method, a slurry casting method and an isostatic hydraulic pressure pressing method, and a sheet molding method such as a doctor blade method and the like.

Subsequent to the above molding operation, the molded bodies are heated to 400° to 550° C. in air or heated to 400° to 800° C. in a non-oxidizing atmosphere such as, for example, a nitrogen gas atmosphere to thereby sufficiently degrease and remove the previously added organic binder.

Next, a plurality of the sheet-shaped molded bodies subjected to the degreasing process are laminated to multi-states in a sintering surface through releasing powder composed of, for example, sintered ceramic powder and a plurality of the molded bodies are sintered at a predetermined sintering temperature as a whole in the above disposition. The sintering operation is carried out by heating the molded bodies at a low temperature of 1650° C. in a non-oxidizing atmosphere of a nitrogen gas or the like for about 2 to 10 hours. Sintering can be carried out particularly at a temperature of about 1500° to 1650° C. which is greatly lower than a conventional temperature by the combined addition of the glass frit component and the oxide components of B, Na, K, Ca, Mn, Al, W etc.

Any non-oxidizing atmosphere which does not react with AlN is applicable as the sintering atmosphere, the sintering operation is usually carried out in a nitrogen gas or a reducing atmosphere containing a nitrogen gas. An $H_2$ gas, CO gas may be used as the reducing gas. Note, the sintering may be carried out in an atmosphere having various pressure conditions including vacuum, (containing a slight amount of a reducing atmosphere), reduced pressure, increased pressure and ordinary pressure.

When the sintering is carried out at a low temperature less than 1500° C., it is difficult to make a sintered body dense and minute, although it depends upon the grain size of material powder and an oxygen content, thus defective characteristics are liable to be caused in strength and thermal conductivity.

On the other hand, when the sintering is carried out at a high temperature exceeding 1650° C., the heat resistance specification of a sintering furnace must be set to a high temperature side, thus manufacturing equipment is made expensive as well as the employment of a continuous manufacturing process is made difficult. Therefore, the sintering temperature is set to the range of 1500° to 1650° C.

When a mixed material having a predetermined composition prepared by adding the above AlN material powder with the sintering assistants and glass frit or oxides of various elements is molded, degreased and sintered under the above conditions, an AlN sintered body having high strength with a dense and minute crystal structure excellent in corrosion resistance and a thermal conductivity (heat transfer coefficient) of 110 W/(mk) or more can be obtained even if it is sintered at a low temperature of 1650° C. or less.

According to the aluminum nitride sintered body arranged as described above and the method of manufacturing the same, since the AlN sintered body is arranged by being added in combination with the predetermined amount of glass frit or the oxides of B, Na, K, Ca, Mn, Al, W etc. together with the sintering assistant and additive composed of oxides of Group IIIa elements, there can be obtained the AlN sintering body having the greatly improved sintering property as well as the thermal conductivity, density and strength which are equal or greater than those of conventional example even if it is sintered at a low temperature of 1650° C. or less.

In particular, since the AlN sintered body can be sintered at the low temperature of 1650° C. or less, it can be continuously manufactured using an ordinary sintering furnace composed of a less expensive insulating material without the need of using an expensive sintering surface satisfying high temperature specification. Therefore, the manufacturing cost and mass-productivity of the AlN sintered body can be greatly improved.

Further, since the protective film composed of the glass frit component is formed on the surface of the AlN crystal grains constituting the AlN sintered body by the addition of glass frit, the corrosion resistance of the AlN sintered body to acid and alkali is greatly improved. Further, since the boundary joint strength between the AlN crystal grains is increased by the above film, a highly strong and dense crystal structure can be obtained. Therefore, the aluminum nitride sintered body having high thermal conductivity intrinsic thereto and excellent in corrosion resistance and strength can be obtained.

BEST MODE OF CARRYING OUT THE INVENTION

Next, the aluminum nitride sintered body according to the present invention will be more specifically described below with reference to the following Examples.

EXAMPLES 1 to 21

A mixed material was prepared by adding each predetermined amount of a glass frit component, and $Y_2O_3$, CeO, $WO_3$, $TiO_2$, $ZrO_2$, $Al_2O_3$, MnO, $Cr_2O_3$, CaO, SrO, $Nd_2O_3$ as sintering assistants to nitride aluminium powder containing 0.8 wt % oxygen as impurity and having an average grain size of 1 μm as shown in Table 2 and mixing them in a ball mill for 20 hours using ethyl alcohol as solvent. Note, glass frit having the compositions shown by symbols A to I in Table 1 was used as the types of the glass frit. Next, pelletized powder was prepared by adding 5.5 wt % paraffin as an organic binder to the mixed material.

Next, a multiplicity of square molded bodies of 50 mm long×50 mm wide×5 mm thick were prepared by filling the molding metal die of a press molding machine with the thus obtained pelletized powder and compressing and molding them in one axial direction by a pressure of 120 MPa. Subsequently, the respective molded bodies were degreased in air at 450° C. for one hour.

Next, AlN sintered bodies according to embodiments 1 to 21 were made by accommodating the respective degreased and molded bodies in an AlN sintering vessel and subjecting them to densifying sintering in a sintering furnace at a sintering temperature of 1525° to 1650° C. shown in Table 2 for 4 hours and then cooling them at the cooling speed of 200° C./hour.

Comparative Example 1

On the other hand, AlN sintered bodies according to Comparative Example 1 having the same dimension as that of Embodiment 3 were made by preparing, molding, degreasing and sintering a material under the same conditions as those of the Embodiment 3 except that only a sintering assistant ($Y_2O_3$) composed of Group IIIa element was added without adding glass frit, CaO and $WO_3$ at all and they were sintered at 1780° C.

Comparative Example 2

AlN sintered bodies according to Comparative Example 2 having the same dimension as that of Embodiment 10 were made by preparing, molding, degreasing and sintering a material under the same conditions as those of Embodiment 10 except that only sintering assistant ($Y_2O_3$) and CaO were added without adding glass frit and $WO_3$ at all and they were sintered at 1680° C.

Comparative Example 3

AlN sintered bodies according to Comparative Example 3 having the same dimension as that of Embodiment 2 were made by preparing, molding, degreasing and sintering a material under the same conditions as those of Embodiment 2 except that 3 wt % of $Y_2O_3$, 1 wt % of CaO and 1 wt % of $Al_2O_3$ were added without adding glass frit at all and they were sintered at 1680° C.

Comparative Example 4

AlN sintered bodies according to Comparative Example 4 having the same dimension as that of Embodiment 10 were made by preparing, molding, degreasing and sintering a material under the same conditions as those of Embodiment 10 except that CaO was excessively added (4 wt %) without adding $Cr_2O_3$ and they were sintered at 1700° C.

Comparative Example 5

AlN sintered bodies according to Comparative Example 5 were made by being processed under the same conditions as those of Example 1 except that $Al_2O_3$ was excessively added (2 wt %).

Comparative Example 6

AlN sintered bodies according to Comparative Example 6 were made by being processed under the same conditions as those of Example 1 except that glass frit was excessively added (2 wt %) and they were sintered at 1500° C.

Comparative Example 7

AlN sintered bodies according to Comparative Example 7 were made by being processed under the same conditions as those of Example 1 except that MnO was excessively added (1 wt %) in place of $Al_2O_3$ and they were sintered at 1600° C.

Comparative Example 8

AlN sintered bodies according to Comparative Example 8 were made by being processed under the same conditions as those of Example 1 except that $Y_2O_3$ was excessively added (10 wt %) as a sintering assistant and they were sintered at 17250° C.

Comparative Example 9

AlN sintered bodies according to Comparative Example 9 were made by being processed under the same conditions as those of Example 3 except that 1 wt % of $Al_2O_3$ was added in addition to 3 wt % of $Y_2O_3$ as a sintering assistant without adding CaO at all and they were sintered at 1700° C.

Comparative Example 10

AlN sintered bodies according to Comparative Example 10 were made by being processed under the same conditions as those of Example 5 except that oxides of Group IIIa elements were not added at all and they were sintered at 1750° C.

Note. although the AlN sintered bodies according to Comparative Examples 1 to 4 and Comparative Examples 8 to 10 among Comparative Examples 1 to 10 were subjected to densifying sintering for 4 hours by being heated to 1600° C., however, they were not densely sintered. thus they were again in subjected to densifying sintering by being heated to sintering temperatures shown in Table 3.

The density and thermal conductivity (heat transfer coefficient) corresponding to the strength of respective specimens were measured to evaluate the strength and radiating characteristics of the thus obtained respective AlN sintered bodies according to Examples 1 to 21 and Comparative Examples 1 to 10 and the results shown in Table 2 and Table 3 were obtained.

TABLE 2

| SPECIMEN No. | TYPE | ADDITIVE AMOUNT | TYPE | ADDITIVE AMOUNT | TYPE | ADDITIVE AMOUNT | GLASS FRIT TYPE | ADDITIVE AMOUNT | AlN | SINTERING TEMPERATURE (τ) | DENSITY (g/cm³) | THERMAL CONDUCTIVITY (W/(m·K)) |
|---|---|---|---|---|---|---|---|---|---|---|---|---|
| EXAMPLE 1 | $Y_2O_3$ | 1 | CaO | 1 | $Al_2O_3$ | 1 | A | 0.5 | Bal. | 1525 | 3.25 | 120 |
| EXAMPLE 2 | $Y_2O_3$ | 1 | CaO | 1 | $Al_2O_3$ $WO_3$ | 1 0.5 | A | 0.2 | Bal. | 1550 | 3.26 | 125 |
| EXAMPLE 3 | $Y_2O_3$ | 3 | CaO | 0.5 | $WO_3$ | 1 | A | 1 | Bal. | 1600 | 3.28 | 136 |
| EXAMPLE 4 | $Y_2O_3$ | 5 | CaO | 1.5 | $Al_2O_3$ | 0.5 | A | 0.5 | Bal. | 1625 | 3.33 | 145 |
| EXAMPLE 5 | $Y_2O_3$ | 7 | CaO | 3 | $WO_3$ | 0.5 | A | 1 | Bal. | 1650 | 3.38 | 140 |
| EXAMPLE 6 | $Y_2O_3$ | 1 | CaO | 1.5 | MnO | 0.2 | A | 0.5 | Bal. | 1575 | 3.26 | 125 |
| EXAMPLE 7 | $Y_2O_3$ | 0.5 | CaO | 2 | $Al_2O_3$ $TiO_2$ | 0.5 0.5 | A | 0.5 | Bal. | 1600 | 3.25 | 118 |
| EXAMPLE 8 | $Y_2O_3$ | 1 | CaO | 1.5 | SrO | 0.2 | A | 0.5 | Bal. | 1625 | 3.26 | 120 |
| EXAMPLE 9 | $Y_2O_3$ | 3 | CaO $WO_3$ | 1 0.5 | $Al_2O_3$ $ZrO_2$ | 0.5 0.2 | A | 0.2 | Bal. | 1625 | 3.29 | 145 |
| EXAMPLE 10 | $Y_2O_3$ | 3 | CaO | 1 | $WO_3$ $Cr_2O_3$ | 0.5 0.5 | A | 0.5 | Bal. | 1625 | 3.29 | 132 |
| EXAMPLE 11 | $Y_2O_3$ | 3 | CaO | 1 | $Al_2O_3$ $WO_3$ | 1.5 0.5 | A | 0.2 | Bal. | 1625 | 3.29 | 140 |
| EXAMPLE 12 | CeO | 3 | CaO | 0.5 | $WO_3$ | 1 | A | 0.5 | Bal. | 1625 | 3.29 | 143 |
| EXAMPLE 13 | $Nd_2O_3$ | 3 | CaO | 0.5 | $WO_3$ | 1 | A | 0.5 | Bal. | 1625 | 3.29 | 141 |
| EXAMPLE 14 | $Y_2O_3$ | 3 | CaO | 0.5 | $WO_3$ | 0.5 | B | 0.5 | Bal. | 1600 | 3.29 | 140 |
| EXAMPLE 15 | $Y_2O_3$ | 3 | CaO | 0.5 | $WO_3$ | 0.5 | C | 0.5 | Bal. | 1625 | 3.29 | 143 |
| EXAMPLE 16 | $Y_2O_3$ | 3 | CaO | 0.5 | $WO_3$ | 0.5 | D | 0.5 | Bal. | 1600 | 3.29 | 140 |
| EXAMPLE 17 | $Y_2O_3$ | 3 | CaO | 0.5 | $WO_3$ | 0.5 | E | 0.5 | Bal. | 1575 | 3.29 | 135 |
| EXAMPLE 18 | $Y_2O_3$ | 3 | CaO | 0.5 | $WO_3$ | 0.5 | F | 0.5 | Bal. | 1575 | 3.30 | 130 |
| EXAMPLE 19 | $Y_2O_3$ | 3 | CaO | 0.5 | $WO_3$ | 0.5 | G | 0.5 | Bal. | 1600 | 3.29 | 139 |
| EXAMPLE 20 | $Y_2O_3$ | 3 | CaO | 0.5 | $WO_3$ | 0.5 | H | 0.5 | Bal. | 1650 | 3.29 | 138 |
| EXAMPLE 21 | $Y_2O_3$ | 3 | CaO | 0.5 | $WO_3$ | 0.5 | I | 0.5 | Bal. | 1575 | 3.30 | 135 |

TABLE 3

| SPECIMEN No. | BLEND RATIO OF MIXED MATERIAL (WT %) COMPONENT OF SINTERING ASSISTANT ||||||| | CHARACTERISTICS OF SINTERED BODY |||
| --- | --- | --- | --- | --- | --- | --- | --- | --- | --- | --- | --- |
| | | | | | | GLASS FRIT || | SINTERING | | THERMAL |
| | TYPE | ADDITIVE AMOUNT | TYPE | ADDITIVE AMOUNT | TYPE | ADDITIVE AMOUNT | TYPE | ADDITIVE AMOUNT | AlN | TEMPERATURE (τ) | DENSITY (g/cm³) | CONDUCTIVITY (W/(m·K)) |
| COMPARATIVE EXAMPLE 1 | Y₂O₃ | 3 | — | — | — | — | — | — | Bal. | 1780 | 3.31 | 173 |
| COMPARATIVE EXAMPLE 2 | Y₂O₃ | 3 | CaO | 1 | — | — | — | — | Bal. | 1680 | 3.30 | 155 |
| COMPARATIVE EXAMPLE 3 | Y₂O₃ | 3 | CaO | 1 | Al₂O₃ | 1 | — | — | Bal. | 1680 | 3.30 | 148 |
| COMPARATIVE EXAMPLE 4 | Y₂O₃ | 3 | CaO | 4 | WO₃ | 0.5 | A | 0.5 | Bal. | 1700 | 3.28 | 125 |
| COMPARATIVE EXAMPLE 5 | Y₂O₃ | 1 | CaO | 1 | Al₂O₂ | 2 | A | 0.5 | Bal. | 1525 | 3.25 | 100 |
| COMPARATIVE EXAMPLE 6 | Y₂O₃ | 1 | CaO | 1 | Al₂O₃ | 1 | A | 2 | Bal. | 1500 | 3.25 | 85 |
| COMPARATIVE EXAMPLE 7 | Y₂O₃ | 1 | CaO | 1 | MnO | 1 | A | 0.5 | Bal. | 1600 | 3.25 | 98 |
| COMPARATIVE EXAMPLE 8 | Y₂O₃ | 10 | CaO | 1 | Al₂O₃ | 1 | A | 0.5 | Bal. | 1725 | 3.42 | 168 |
| COMPARATIVE EXAMPLE 9 | Y₂O₃ | 3 | — | — | Al₂O₃ | 1 | A | 1 | Bal. | 1700 | 3.30 | 138 |
| COMPARATIVE EXAMPLE 10 | — | — | CaO | 3 | WO₃ | 0.5 | A | 1 | Bal. | 1750 | 3.26 | 115 |

As apparent from the results shown in Table 2 and Table 3, it was found that the AlN sintered bodies according to Examples 1 to 21 which were added with the small amount of the glass frit component in addition to the sintering assistants such as Y₂O₃, CaO etc. had a dense and fine crystal structure and were excellent in both the density and thermal conductivity (heat transfer coefficient) regardless of that they were made at the low sintering temperature of 1650° C. or less. More specifically, they were excellent in the density and thermal conductivity (heat transfer coefficient) because the density was 3.25 to 3.38 g/cm³ which were the same as or more than the conventional ones and the thermal conductivity was 118 to 145 W/(m·k).

Further, the following immersion test was carried out to evaluate the corrosion resistance of the respective sintered bodies from the two aspects of resistance to acid and resistance to alkali. That is, the respective sintered bodies were immersed into a hydrochloric acid (HCl) solution of 10% concentration at an ordinary temperature (25° C.) for 24 hours and the decrease of weight thereof per unit area caused by acid corrosion after the immersion was measured. Further, the respective sintered bodies were immersed in a caustic soda (NaOH) solution of 10% concentration at an ordinary temperature (25° C.) for 24 hours and the decrease of weight thereof per unit area caused by alkali corrosion after the immersion was measured.

As a result, the decrease of weight due to acid of the AlN sintered bodies according to the respective embodiments was 1.5 mg/cm² or less which was one third or less that of the conventional AlN sintered bodies shown in Comparative Examples 1 to 3, thus they exhibited excellent resistance to acid. Further, the decrease of weight due to acid thereof were 50 mg/cm² or less which was one half or less that of the conventional AlN sintered bodies, thus it was found that they exhibited excellent resistance to alkali.

On the other hand, the AlN sintered bodies according to Comparative Examples 1 to 3 to which glass frit was not added at all could not be made dense and minute by the sintering carried out at the low temperature of 1650° C. or less and had to be sintered at a high temperature of 1680° to 1780° C., thus the effect of improvement intended by the present invention that an equipment cost was reduced and productivity was increased by the low temperature sintering could not be achieved.

Further, sintering at a high temperature of 1700° C. or more was also required in the AlN sintered bodies according to Comparative Example 4 to which CaO was excessively added in an amount of 4 wt %. Further, although the specimens of Comparative Example 5 to which Al₂O₃ was excessively added could be sintered at the low temperature, the thermal conductivity (heat transfer coefficient) thereof was greatly lowered.

The specimens of Comparative Example 6 to which glass frit was excessively added had an insufficient thermal conductivity and further the thermal conductivity of the specimens of Comparative Example 7 to which MnO was excessively added was more deteriorated. Further, it was confirmed that the specimens of Comparative Example 8 to which $Y_2O_3$ was excessively added in an amount of 10 wt % had to be sintered at the high temperature of 1700° C. or more regardless of that glass frit was added as well as had a lowered resistance to alkali corrosion property.

In addition, it was found that the AlN sintered bodies according to Comparative Example 9 to which CaO as the sintering assistant was not added at all had to be sintered at the high temperature of 1700° C. or more. Further, it was found that the AlN sintered bodies according to Comparative Example 10 to which oxides of Group IIIa elements were not added at all had to be sintered at the high temperature of 1750° C. or more regardless of that CaO and $WO_3$ were added as well as glass frit was also added and that corrosion caused by the addition of CaO was abruptly increased. Likewise, it was confirmed that the AlN sintered bodies according to Comparative Example 4 to which CaO was excessively added had to be sintered at 1700° C. or more and a resistance to alkali property was lowered.

On the other hand, according to the methods of manufacturing the AlN sintered bodies of the respective Embodiments, since glass frit was blended to the material powder, the AlN sintered bodies having denseness and minuteness, high strength, high thermal conductivity and high corrosion resistance could be obtained even if they were sintered at the low temperature of about 1525° to 1650° C. Consequently, they could be made by continuously operating the ordinary sintering furnace composed of less expensive heat resistant components without the use of a high temperature sintering furnace, thus the manufacturing cost and mass-productivity of the AlN sintered bodies could be greatly improved.

Further, as apparent from the results shown in Embodiments 1, 2, 3, 7, 14, 16, 19, 21 of Table 2 and Table 3, when CaO, $Al_2O_3$, MnO, $ZrO_2$, $Cr_2O_3$, SrO, $WO_3$, $TiO_2$, etc. were added in combination in addition to oxides of Group IIIa elements as the sintering assistants and glass frit, the sintering temperature could be lowered up to about 1525° to 1625° C., thus it was proved that the manufacturing conditions were more effectively eased when sintering was carried out at the low temperature.

When the surfaces of the respective sintered bodies according to Examples 1 to 21 were observed under a scanning type electron microscope (SEM), it was confirmed that grain boundary phases were uniformly dispersed and formed in the vicinity of fine AlN grains and protective films composed of the glass frit component were formed on the surfaces of the AlN grains. On the other hand, in the sintered bodies according to Comparative Examples 1 to 3, AlN grains were coarse by themselves and coarse grain boundary phases were formed so as to be condensed in the vicinity of the adjacent AlN grains because a sintering property improving effect resulting from the addition of glass frit was small.

Examples 22 to 36

A mixed material was prepared by adding each predetermined amount of $Y_2O_3$, CeO, $WO_3$, $TiO_2$, $ZrO_2$, $Al_2O_3$, CaWO4, $B_2O_3$, $Na_2O$, $K_2O$, $Li_2O$, MnO, $Cr_2O_3$, CaO, SrO, $Nd_2O_3$ as sintering assistants to nitride aluminum powder containing 0.8 wt % oxygen as impurity and having an average grain size of 1 μm as shown in Table 4 to Table 5 and mixing them in a ball mill for 20 hours using ethyl alcohol as solvent. Next, pelletized powder was prepared by adding 5.5 wt % paraffin as an organic binder to the mixed material.

Next, a multiplicity of square molded bodies of 50 mm long×50 mm wide×5 mm thick were prepared by filling the molding metal die of a press molding machine with the thus obtained pelletized powder and compressing and molding them in one axial direction by a pressure of 120 MPa. Subsequently, the respective molded bodies were degreased in air at 450° C. for one hour.

Next, AlN sintered bodies according to Embodiments 22 to 36 were made by accommodating the respective degreased and molded bodies in an AlN sintering vessel and subjecting them to densifying sintering in a sintering furnace at the sintering temperature of 1525° to 1625° C. shown in Table 4 to Table 5 for 4 hours and then cooling them at the cool ing speed of 200° C./hour.

Comparative Example 11

On the other hand, AlN sintered bodies according to Comparative Example 11 having the same dimension as that of Embodiment 24 were made by preparing, molding, degreasing and sintering a material under the same conditions as those of Embodiment 24 except that only a sintering assistant ($Y_2O_3$) composed of oxide of Group IIIa element was added without adding CaO, $B_2O_3$, $Na_2O$, $K_2O$ and $WO_3$ at all and they were sintered at 1780° C.

Comparative Example 12

AlN sintered bodies according to Comparative Example 12 having the same dimension as that of Embodiment 24 were made by preparing, molding, degreasing and sintering a material under the same conditions as those of Embodiment 24 except that only sintering assistants ($Y_2O_3$) and CaO were added without adding $B_2O_3$, $Na_2O$, $K_2O$ and $WO_3$ at all and they were sintered at 1680° C.

Comparative Example 13

AlN sintered bodies according to Comparative Example 13 having the same dimension as that of Embodiment 24 were made by preparing, molding, degreasing and sintering a material under the same conditions as those of Embodiment 24 except that 3 wt % $Y_2O_3$, 1 wt % CaO and 1 wt % $Al_2O_3$ were added without adding $B_2O_3$, $Na_2O$, $K_2O$ and $WO_3$ at all and they were sintered at 1680° C.

Comparative Example 14

AlN sintered bodies according to Comparative Example 14 having the same dimension as that of Embodiment 24 were made by preparing, molding, degreasing and sintering a material under the same conditions as those of the Embodiment 24 except that CaO was excessively added (4 wt %) and 0.5 wt % of $B_2O_3$ was added without adding $Al_2O_3$ and they were sintered at 1680° C.

Comparative Example 15

AlN sintered bodies according to Comparative Example 15 were made by being processed under the same conditions as those of Example 23 except that $Al_2O_3$ was excessively added (2 wt %) and they were sintered at 1550° C. as shown in Table 6.

Comparative Example 16

AlN sintered bodies according to Comparative Example 16 were made by being processed under the same conditions as those of Example 23 except that $B_2O_3$, $Na_2O$, $K_2O$ were excessively added, respectively and they were sintered at 1500° C.

Comparative Example 17

AlN sintered bodies according to Comparative Example 17 were made by being processed under the same conditions as those of Example 23 except that MnO was excessively added (1 wt %) as a sintering assistant in place of $WO_3$ and they were sintered at 1575° C.

Comparative Example 18

AlN sintered bodies according to Comparative Example 18 were made by being processed under the same conditions as those of Example 23 except that $Y_2O_3$ was excessively added (10 wt %) as a sintering assistant and they were sintered at 1725° C.

Comparative Example 19

AlN sintered bodies according to Comparative Example 19 were made by being processed under the same conditions as those of Example 24 except that 1 wt % of $Al_2O_3$ as a sintering assistant was added in addition to 3 wt % of $Y_2O_3$ and they were sintered at 1700° C.

Comparative Example 20

AlN sintered bodies according to Comparative Example 20 were made by being processed under the same conditions as those of Example 22 except that oxide of Group IIIa element as a sintering assistant was not added at all and 3 wt % of CaO and 1 wt % of $Al_2O_3$ was added and they were sintered at 1750° C.

Comparative Example 21

AlN sintered bodies according to Comparative Example 21 were made by being processed under the same conditions as those of Example 24 except that $CaWO_4$ was excessively added (4 wt %) in place of CaO and $WO_3$ and they were sintered at 1680° C.

Note, although the AlN sintered bodies according to Comparative Examples 11 to 14 and Comparative Examples 18 to 21 among the above Comparative Examples 11 to 21 were subjected to densifying sintering for 4 hours by being heated to 1600° C., they were not densely sintered, thus they were subjected to densifying sintering by being heated to the sintering temperatures shown in Tables 6 to 7.

The density and the thermal conductivity (heat transfer coefficient) corresponding to the strength of respective specimens were measured to evaluate the strength and heat radiating characteristics of the thus obtained respective AlN sintered bodies according to Examples 22 to 36 and Comparative Examples 11 to 21 and the results shown in Table 4 to Table 7 were obtained.

TABLE 4

| SPECIMEN No. | BLEND RATIO OF MIXED MATERIAL (WT %) COMPONENT OF SINTERING ASSISTANT | | | | | | | | | CHARACTERISTICS OF SINTERED BODY | | |
|---|---|---|---|---|---|---|---|---|---|---|---|---|
| | TYPE | ADDITIVE AMOUNT | TYPE | ADDITIVE AMOUNT | TYPE | ADDITIVE AMOUNT | GLASS FRIT TYPE | ADDITIVE AMOUNT | AlN | SINTERING TEMPERATURE (τ) | DENSITY (g/cm³) | THERMAL CONDUCTIVITY (W/(m·K)) |
| EXAMPLE 22 | $Y_2O_3$ | 0.5 | CaO $Al_2O_3$ | 1.5 1 | $B_2O_3$ $Na_2O$ $K_2O$ | 0.5 0.2 0.2 | $WO_3$ | 0.5 | Bal. | 1525 | 3.25 | 118 |
| EXAMPLE 23 | $Y_2O_3$ | 1 | CaO $Al_2O_3$ | 1 1 | $B_2O_3$ $Na_2O$ $K_2O$ | 0.2 0.1 0.1 | $WO_3$ | 0.5 | Bal. | 1575 | 3.26 | 126 |
| EXAMPLE 24 | $Y_2O_3$ | 3 | CaO | 1 | $B_2O_3$ $Na_2O$ $K_2O$ | 0.2 0.1 0.1 | $WO_3$ | 0.5 | Bal. | 1600 | 3.30 | 148 |
| EXAMPLE 25 | $Y_2O_3$ | 5 | CaO $Al_2O_3$ | 0.5 1 | $B_2O_3$ $Na_2O$ $K_2O$ | 0.5 0.2 0.2 | $WO_3$ | 1 | Bal. | 1625 | 3.36 | 150 |
| EXAMPLE 26 | $Y_2O_3$ | 7 | CaO $Al_2O_3$ | 3 1.5 | $B_2O_3$ $Na_2O$ $K_2O$ | 0.5 0.2 0.2 | $WO_3$ | 1 | Bal. | 1625 | 3.40 | 150 |
| EXAMPLE 27 | $Y_2O_3$ | 3 | CaO $Al_2O_3$ | 1 1 | $B_2O_3$ $Na_2O$ $K_2O$ | 0.2 0.1 0.1 | — | — | Bal. | 1600 | 3.29 | 140 |
| EXAMPLE 28 | $Y_2O_3$ | 1 | CaO | 2 | $B_2O_3$ $Na_2O$ $K_2O$ | 0.1 0.1 0.1 | $WO_3$ | 0.5 | Bal. | 1575 | 3.26 | 128 |
| EXAMPLE 29 | $Y_2O_3$ | 3 | CaO | 1 | $B_2O_3$ $Na_2O$ $K_2O$ | 0.1 0.05 0.05 | $Li_2O$ MnO $ZrO_2$ | 0.1 0.1 0.1 | Bal. | 1600 | 3.29 | 140 |

TABLE 5

| SPECIMEN No. | BLEND RATIO OF MIXED MATERIAL (WT %) ||||||||| CHARACTERISTICS OF SINTERED BODY |||
| | COMPONENT OF SINTERING ASSISTANT ||||||||  | SINTERING | | THERMAL |
| | TYPE | ADDITIVE AMOUNT | TYPE | ADDITIVE AMOUNT | TYPE | ADDITIVE AMOUNT | TYPE | ADDITIVE AMOUNT | AlN | TEMPERATURE (τ) | DENSITY (g/cm³) | CONDUCTIVITY (W/m·K) |
|---|---|---|---|---|---|---|---|---|---|---|---|---|
| EXAMPLE 30 | $Y_2O_3$ | 3 | CaO | 1 | $B_2O_3$<br>$Na_2O$<br>$K_2O$ | 0.1<br>0.1<br>0.1 | MnO | 0.5 | Bal. | 1575 | 3.29 | 138 |
| EXAMPLE 31 | $Y_2O_3$ | 3 | CaO | 1 | $B_2O_3$<br>$Na_2O$<br>$K_2O$ | 0.1<br>0.1<br>0.1 | $Cr_2O_3$<br>$TiO_2$<br>SrO | 0.2<br>0.2<br>0.1 | Bal. | 1600 | 3.29 | 135 |
| EXAMPLE 32 | $Y_2O_3$ | 3 | CaO | 1 | $B_2O_3$<br>$Na_2O$<br>$K_2O$ | 0.2<br>0.1<br>0.1 | $WO_3$<br>MnO<br>$ZrO_2$ | 0.5<br>0.1<br>0.1 | Bal. | 1575 | 3.30 | 140 |
| EXAMPLE 33 | CeO | 3 | CaO | 1 | $B_2O_3$<br>$Na_2O$<br>$K_2O$ | 0.2<br>0.1<br>0.1 | $WO_3$ | 0.5 | Bal. | 1600 | 3.29 | 140 |
| EXAMPLE 34 | $Nd_2O_3$ | 3 | CaO | 1 | $B_2O_3$<br>$Na_2O$<br>$K_2O$ | 0.2<br>0.1<br>0.1 | $WO_3$ | 0.5 | Bal. | 1625 | 3.30 | 142 |
| EXAMPLE 35 | $Y_2O_3$ | 3 | $CaWO_4$ | 1 | $B_2O_3$<br>$Na_2O$<br>$K_2O$ | 0.5<br>0.2<br>0.2 | — | — | Bal. | 1600 | 3.29 | 140 |
| EXAMPLE 36 | $Y_2O_3$ | 3 | $CaWO_4$ | 3 | $B_2O_3$<br>$Na_2O$<br>$K_2O$ | 0.2<br>0.1<br>0.1 | — | — | Bal. | 1625 | 3.30 | 149 |

TABLE 6

| SPECIMEN No. | BLEND RATIO OF MIXED MATERIAL (WT %) ||||||||| CHARACTERISTICS OF SINTERED BODY |||
| | COMPONENT OF SINTERING ASSISTANT |||||||| | SINTERING | | THERMAL |
| | TYPE | ADDITIVE AMOUNT | TYPE | ADDITIVE AMOUNT | TYPE | ADDITIVE AMOUNT | TYPE | ADDITIVE AMOUNT | AlN | TEMPERATURE (τ) | DENSITY (g/cm³) | CONDUCTIVITY (W/m·K) |
|---|---|---|---|---|---|---|---|---|---|---|---|---|
| COMPARATIVE EXAMPLE 11 | $Y_2O_3$ | 3 | — | — | — | — | — | — | Bal. | 1780 | 3.31 | 173 |
| COMPARATIVE EXAMPLE 12 | $Y_2O_3$ | 3 | CaO | 1 | — | — | — | — | Bal. | 1680 | 3.30 | 155 |
| COMPARATIVE EXAMPLE 13 | $Y_2O_3$ | 3 | CaO<br>$Al_2O_3$ | 1<br>1 | — | — | — | — | Bal. | 1680 | 3.30 | 148 |
| COMPARATIVE EXAMPLE 14 | $Y_2O_3$ | 3 | CaO | 4 | $B_2O_3$<br>$Na_2O$<br>$K_2O$ | 0.5<br>0.2<br>0.2 | $WO_3$ | 0.5 | Bal. | 1680 | 3.27 | 120 |
| COMPARATIVE EXAMPLE 15 | $Y_2O_3$ | 1 | CaO<br>$Al_2O_2$ | 1<br>2 | $B_2O_3$<br>$Na_2O$<br>$K_2O$ | 0.2<br>0.1<br>0.1 | $WO_3$ | 0.5 | Bal. | 1550 | 3.25 | 105 |
| COMPARATIVE EXAMPLE 16 | $Y_2O_3$ | 1 | CaO<br>$Al_2O_2$ | 1<br>1 | $B_2O_3$<br>$Na_2O$<br>$K_2O$ | 1<br>0.5<br>0.5 | $WO_3$ | 0.5 | Bal. | 1500 | 3.25 | 87 |

TABLE 7

| SPECIMEN No. | BLEND RATIO OF MIXED MATERIAL (WT %) | | | | | | | | | CHARACTERISTICS OF SINTERED BODY | | |
|---|---|---|---|---|---|---|---|---|---|---|---|---|
| | COMPONENT OF SINTERING ASSISTANT | | | | | | | | | SINTERING TEMPERATURE ($\tau$) | DENSITY (g/cm$^3$) | THERMAL CONDUCTIVITY (W/m·K)) |
| | TYPE | ADDITIVE AMOUNT | TYPE | ADDITIVE AMOUNT | TYPE | ADDITIVE AMOUNT | TYPE | ADDITIVE AMOUNT | Aln | | | |
| COMPARATIVE EXAMPLE 17 | $Y_2O_3$ | 1 | CaO $Al_2O_3$ | 1 1 | $B_2O_3$ $Na_2O$ $K_2O$ | 0.2 0.1 0.1 | MnO | 1 | Bal. | 1575 | 3.26 | 95 |
| COMPARATIVE EXAMPLE 18 | $Y_2O_3$ | 10 | CaO $Al_2O_3$ | 1 1 | $B_2O_3$ $Na_2O$ $K_2O$ | 0.2 0.1 0.1 | $WO_3$ | 0.5 | Bal. | 1725 | 3.43 | 165 |
| COMPARATIVE EXAMPLE 19 | $Y_2O_3$ | 3 | $Al_2O_3$ | 1 | $B_2O_3$ $Na_2O$ $K_2O$ | 0.5 0.2 0.2 | $WO_3$ | 0.5 | Bal. | 1700 | 3.30 | 140 |
| COMPARATIVE EXAMPLE 20 | — | — | CaO $Al_2O_3$ | 3 1 | $B_2O_3$ $Na_2O$ $K_2O$ | 0.5 0.2 0.2 | WO | 0.5 | Bal. | 1750 | 3.26 | 110 |
| COMPARATIVE EXAMPLE 21 | $Y_2O_3$ | 3 | $CaWO_4$ | 4 | $B_2O_3$ $Na_2O$ $K_2O$ | 0.2 0.1 0.1 | — | — | Bal. | 1680 | 3.32 | 145 |

As apparent from the results shown in Table 4 to Table 7, it was found that the AlN sintered bodies according to Examples 22 to 36 which were added with oxide components of Al, B, Na, K, W, Li, Mn, Cr, Ti, Sr, Zr etc. in a small amount in combination in addition to the sintering assistants such as $Y_2O_3$, CaO etc. had a dense and fine crystal structure and were excellent in the density and thermal conductivity (heat transfer coefficient) regardless of that they were made at the low sintering temperature of 1650° C. or less. More specifically, they were excellent in the density and thermal conductivity because the density was 3.25 to 3.40 g/cm$^3$ which were the same as or more than the conventional ones and thermal conductivity was 118 to 150 W/(mk).

On the other hand, the AlN sintered bodies according to Comparative Examples 11 to 13 to which $B_2O_3$, $Na_2O$, $K_2O$, $WO_3$ were not added at all could not be made dense by the sintering carried out at the low temperature of 1650° C. or less and had to be sintered at a high temperature of 1680° to 1780° C., thus the effect of improvement intended by the present invention that an equipment cost was reduced and productivity was increased could not be achieved. Further, sintering at a high temperature of 1680° C. or more was also required in the AlN sintered bodies according to Comparative Example 14 to which CaO was excessively added in an amount of 4 wt %. Further, although the specimens of Comparative Example 15 to which $Al_2O_3$ was excessively added could be sintered at a low temperature, the thermal conductivity thereof was greatly lowered.

The specimens of Comparative Example 16 to which $B_2O_3$, $Na_2O$, $K_2O$ were excessively added had an insufficient thermal conductivity and further the thermal conductivity of the specimens of Comparative Example 17 to which MnO was excessively added was more deteriorated. Further it was confirmed that the specimens of Comparative Example 18 to which $Y_2O_3$ was excessively added in an amount of 10 wt % had to be sintered at the high temperature of 1725° C. or more regardless of that $B_2O_3$, $Na_2O$, $K_2O$ were added as well as had a lowered resistance to alkali corrosion property.

In addition, it was found that the AlN sintered bodies according to Comparative Example 19 to which CaO as the sintering assistant was not added at all had to be sintered at the high temperature of 1700° C. or more. Further, it was found that the AlN sintered bodies according to Comparative Example 20 to which oxides of Group IIIa elements were not added at all had to be sintered at the high temperature of 1750° C. or more regardless of that CaO and $WO_3$ were added as well as $B_2O_3$, NaO, $K_2O$ were added and that corrosion caused by the addition of CaO was abruptly increased. Likewise, it was also confirmed that the AlN sintered bodies according to Comparative Example 21 to which $CaWO_4$ was excessively added had to be sintered at a high temperature of 1680° C. or more and a resistance to alkali property was lowered.

On the other hand, according to the methods of manufacturing the AlN sintered bodies of the respective Embodiments, since Y, Ca, Al, B, Na, K, W, Li, Mn, Zr, Cr, Ti, Sr etc. were blended in combination in the material powder, the AlN sintered bodies having denseness or minuteness, high strength, high thermal conductivity and high corrosion resistance could be obtained even if they were sintered at the low temperature of about 1525° to 1625° C. Consequently, they could be made by continuously operating the ordinary sintering furnace composed of less expensive heat resistant components without the use of a high temperature sintering furnace, thus the manufacturing cost and mass-productivity of the AlN sintered bodies could be greatly improved. Further, as apparent from the results shown in Embodiments 22, 23, 28, 30, 32 of Table 4 to Table 5, when CaO, $Al_2O_3$, $B_2O_3$, $Na_2O$, $K_2O$, $Li_2O$, MnO, $ZrO_2$, $Cr_2O_3$, SrO, $WO_3$, $TiO_3$ etc. were added in combination in addition to oxides of Group IIIa elements as the sintering assistants, the sintering temperature could be lowered up to about 1525° to 1575° C., thus it was proved that the manufacturing conditions were more effectively eased when sintering was carried out at the low temperature.

When the surfaces of the respective sintered bodies according to Examples 22 to 36 were observed by means of a scanning type electron microscope (SEM), it was confirmed that grain boundary phases were uniformly dispersed and formed in the vicinity of the fine AlN grains. On the other hand, in the sintered bodies according to Comparative Examples 11 to 13, the AiN grains were coarse by themselves and coarse grain boundary phases were formed so as to be condensed in the vicinity of the adjacent AlN grains because a sintering property improving effect resulting from the addition of $B_2O_3$, $Na_2O$, $K_2O$ was small.

INDUSTRIAL APPLICABILITY

As described above, according to the aluminum nitride sintered body and the method of manufacturing the same, since the AlN sintered bodies are made by being added with each predetermined amount of glass frit or oxides of B, Na, K, Ca, Mn, Al, W etc. in combination together with the sintering assistants and additives composed of oxides of Group IIIa elements, etc., the sintering property is greatly improved and even if they are sintered at the low temperature of 1650° C. or less, the AlN sintered bodies having the thermal conductivity, density and strength same as or greater than those of conventional ones can be obtained. In particular, since the AlN sintered bodied can be sintered at the low temperature of 1650° C. or less, the AlN sintered body can be continuously manufactured using the ordinary sintering furnace without the need of using an expensive sintering furnace of high temperature specification. Therefore, the manufacturing cost and mass-productivity of the AlN sintered body can be greatly improved.

Further, since the protective films composed of the glass frit component are formed on the surfaces of the AlN grains constituting the AlN sintered body by the addition of glass frit, the corrosion resistance of the AlN sintered body to acid and alkali is greatly improved. Further, since the boundary joint strength between AlN grains is increased by the above films, a highly strong and dense crystal structure can be obtained. Therefore, the aluminum nitride sintered body having high thermal conductivity intrinsic thereto and excellent in corrosion resistance and strength can be obtained.

I claim:

1. An aluminum nitride sintered body made by being sintered at a low temperature of 1650° C. or less, comprising 0.5 to 7 wt % of oxide of at least one element selected from Group IIIa elements in the periodic table, 0.5 to 3 wt % of calcium oxide, 1.5 wt % or less of aluminum oxide, 0.2 to 1 wt % of glass frit, 0.5 wt % or less of at least one selected from lithium oxide, manganese oxide, chromium oxide, zirconium oxide, strontium oxide and titanium oxide, 1 wt % or less of tungsten in terms of oxide thereof and the balance being aluminum nitride, wherein said glass frit comprises 50 wt % or more $SiO_2$.

2. An aluminium nitride sintered body according to claim 1, comprising 1 to 3 wt % of calcium tungstate in place of calcium oxide and tungsten.

3. An aluminum nitride sintered body according to claim 1, wherein said sintered body has a thermal conductivity of 110 W/(m·K) or more.

4. An aluminum nitride sintered body according to claim 1, wherein said glass frit is at least one selected from borosilicate glass, alumino-borosilicate glass, 96% quartz glass, soda lime glass, lead glass, aluminosilicate glass and glass containing $ZrO_2$.

5. An aluminum nitride sintered body made by being sintered at a low temperature of 1650° C. or less, comprising 0.5 to 7 wt % of oxide of at least one element selected from Group IIIa elements in the periodic table, 0.5 to 3 wt % of calcium oxide, 1.5 wt % or less of aluminum oxide, 0.1 to 0.5 wt % of boron oxide, 0.05 to 0.2 wt % of sodium oxide, 0.05 to 0.2 wt % of potassium oxide, 0.5 wt % or less of at least one selected from lithium oxide, manganese oxide, chromium oxide, zirconium oxide, strontium oxide and titanium oxide, 1 wt % or less of tungsten in terms of oxide thereof and the balance being aluminum nitride.

6. An aluminium nitride sintered body according to claim 5, comprising 1 to 3 wt % of calcium tungstate in place of calcium oxide and tungsten.

7. An aluminum nitride sintered body according to claim 5, wherein said sintered body has a thermal conductivity of 110 W/(m·K) or more.

8. A method of manufacturing an aluminum nitride sintered body, comprising the steps of:

preparing a material mixture by adding 0.5 to 7 wt % of oxide of at least one element selected from Group IIIa elements in the periodic table, 0.5 to 3 wt % of calcium oxide, 1.5 wt % or less of aluminum oxide, 0.2 to 1 wt % of glass frit, 0.5 wt % or less of at least one selected from manganese oxide, chromium oxide, zirconium oxide, strontium oxide and titanium oxide, and 1 wt % or less of tungsten in terms of oxide thereof to aluminum nitride material powder;

molding said material mixture to form a molded body; and sintering the thus obtained molded body in a non-oxidizing atmosphere at a low temperature of 1650° C. or less;

wherein said glass frit comprises 50 wt % or more $SiO_2$.

9. A method of manufacturing an aluminum nitride sintered body according to claim 8, wherein 1 to 3 wt % of calcium tungstate is added in place of calcium oxide and tungsten.

10. A method of manufacturing an aluminum nitride sintered body according to claim 8, wherein the content of oxygen in said aluminium nitride material powder is 1.3 wt % or less.

11. A method of manufacturing an aluminum nitride sintered body, comprising the steps of:

preparing a material mixture by adding 0.5 to 7 wt % of oxide of at least one element selected from Group IIIa elements in the periodic table, 0.5 to 3 wt % of calcium oxide, 1.5 wt % or less of aluminum oxide, 0.1 to 0.5 wt % of boron oxide, 0.05 to 0.2 wt % of sodium oxide, 0.05 to 0.2 wt % of potassium oxide, 0.5 wt % or less of at least one selected from lithium oxide, manganese oxide, chromium oxide, zirconium oxide, strontium oxide and titanium oxide, and 1 wt % or less of tungsten in terms of oxide thereof to aluminum nitride material powder;

molding said material mixture to form a molded body; and sintering the thus obtained molded body in a non-oxidizing atmosphere at a low temperature of 1650° C. or less.

12. A method of manufacturing an aluminum nitride sintered body according to claim 11, wherein 1 to 3 wt % of calcium tungstate is added in place of calcium oxide and tungsten.

13. A method of manufacturing an aluminium nitride sintered body according to claim 11, wherein the content of oxygen in said aluminum nitride material powder is 1.3 wt % or less.

* * * * *